United States Patent [19]
Gorholt et al.

[11] Patent Number: 4,596,689
[45] Date of Patent: Jun. 24, 1986

[54] LATERAL RESTRAINT ASSEMBLY FOR REACTOR CORE

[75] Inventors: Wilhelm Gorholt, San Diego; Raymond K. Luci, Del Mar, both of Calif.

[73] Assignee: GA Technologies Inc., San Diego, Calif.

[21] Appl. No.: 412,186

[22] Filed: Aug. 27, 1982

[51] Int. Cl.⁴ .............................................. G21C 13/04
[52] U.S. Cl. .................................... 376/302; 376/304; 376/285
[58] Field of Search ............... 376/302, 304, 381, 382, 376/285, 286, 287, 458; 267/60, 134, 167, 174, 178, 179

[56] References Cited

U.S. PATENT DOCUMENTS

| | | | |
|---|---|---|---|
| 2,518,733 | 8/1950 | Walker | 280/124 |
| 2,520,442 | 8/1950 | Schwartz | 248/358 |
| 2,631,841 | 3/1953 | Tillou et al. | 267/1 |
| 2,775,445 | 12/1956 | Goodloe | 267/9 |
| 3,115,448 | 12/1963 | Hackney et al. | 376/304 |
| 3,544,425 | 12/1970 | Shaw et al. | 376/302 X |
| 3,624,846 | 12/1971 | Rub . | |
| 3,720,581 | 3/1973 | Kaser | 376/302 X |
| 3,784,219 | 1/1974 | van der Burgt et al. | 280/104 |
| 3,900,367 | 8/1975 | Class | 176/87 |
| 3,964,969 | 6/1976 | Brynsvold et al. | 176/87 |
| 4,073,685 | 2/1978 | Brown et al. | 176/87 |
| 4,135,974 | 1/1979 | Garkisch et al. | 376/302 |

FOREIGN PATENT DOCUMENTS

| | | | |
|---|---|---|---|
| 1261606 | 2/1968 | Fed. Rep. of Germany | 376/304 |
| 2484125 | 12/1981 | France | 376/302 |
| 608057 | 9/1960 | Italy | 376/304 |
| 865286 | 5/1959 | United Kingdom . | |
| 1396499 | 7/1972 | United Kingdom . | |

*Primary Examiner*—Charles T. Jordan
*Assistant Examiner*—Dan Wasil
*Attorney, Agent, or Firm*—Fitch, Even, Tabin & Flannery

[57] ABSTRACT

A restraint assembly for use in restraining lateral movement of a reactor core relative to a reactor vessel wherein a plurality of restraint assemblies are interposed between the reactor core and the reactor vessel in circumferentially spaced relation about the core. Each lateral restraint assembly includes a face plate urged against the outer periphery of the core by a plurality of compression springs which enable radial preloading of outer reflector blocks about the core and resist low-level lateral motion of the core. A fixed radial key member cooperates with each face plate in a manner enabling vertical movement of the face plate relative to the key member but restraining movement of the face plate transverse to the key member in a plane transverse to the center axis of the core. In this manner, the key members which have their axes transverse to or subtending acute angles with the direction of a high energy force tending to move the core laterally relative to the reactor vessel restrain such lateral movement.

14 Claims, 6 Drawing Figures

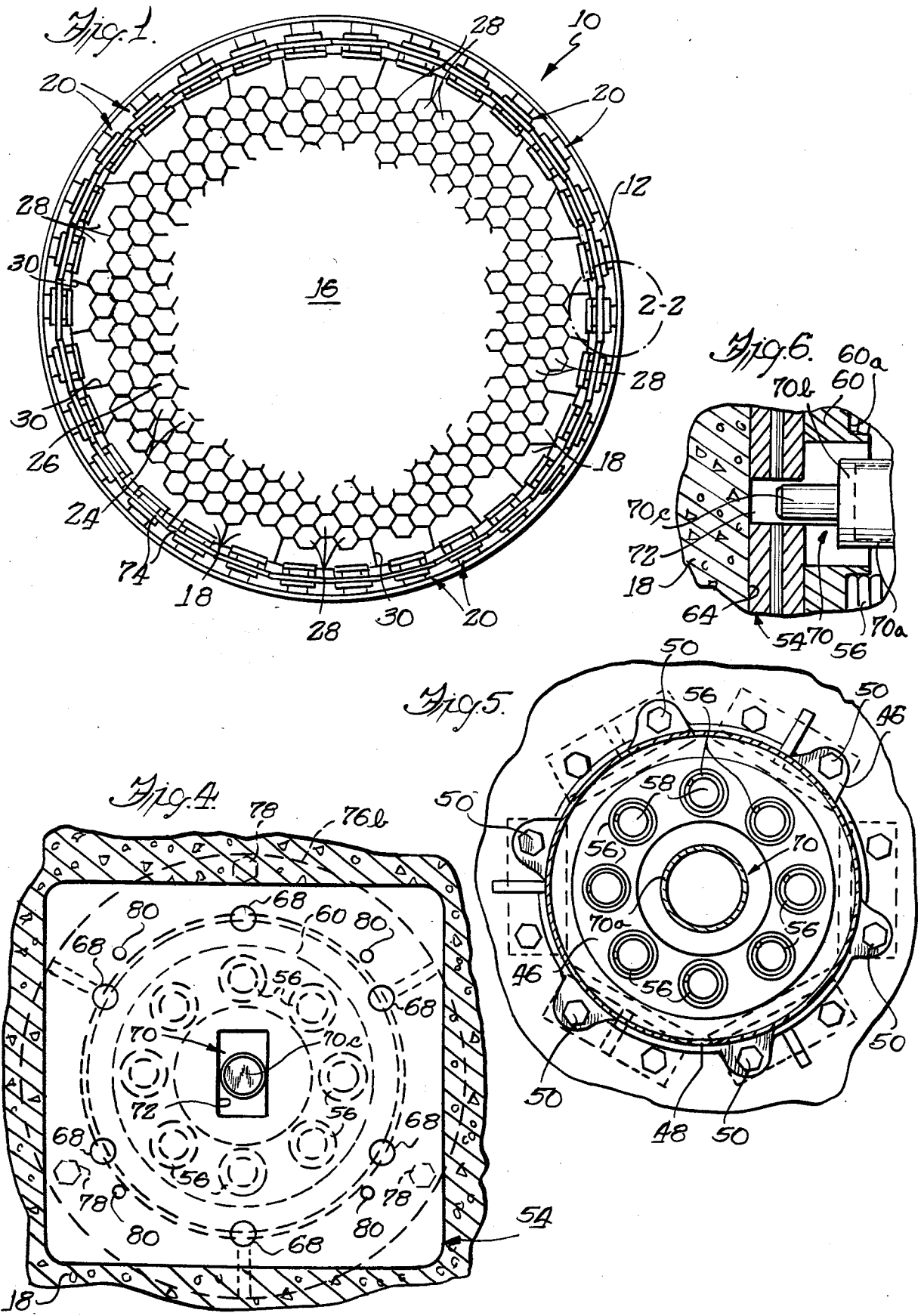

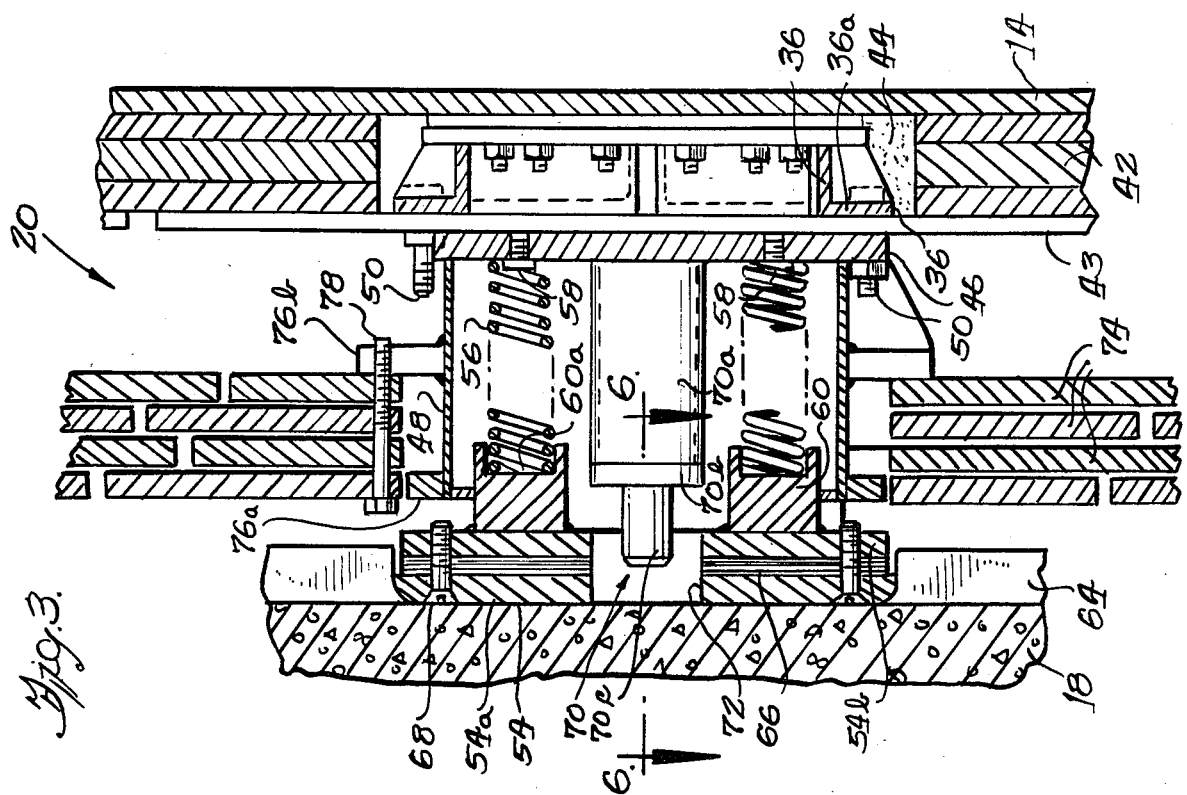
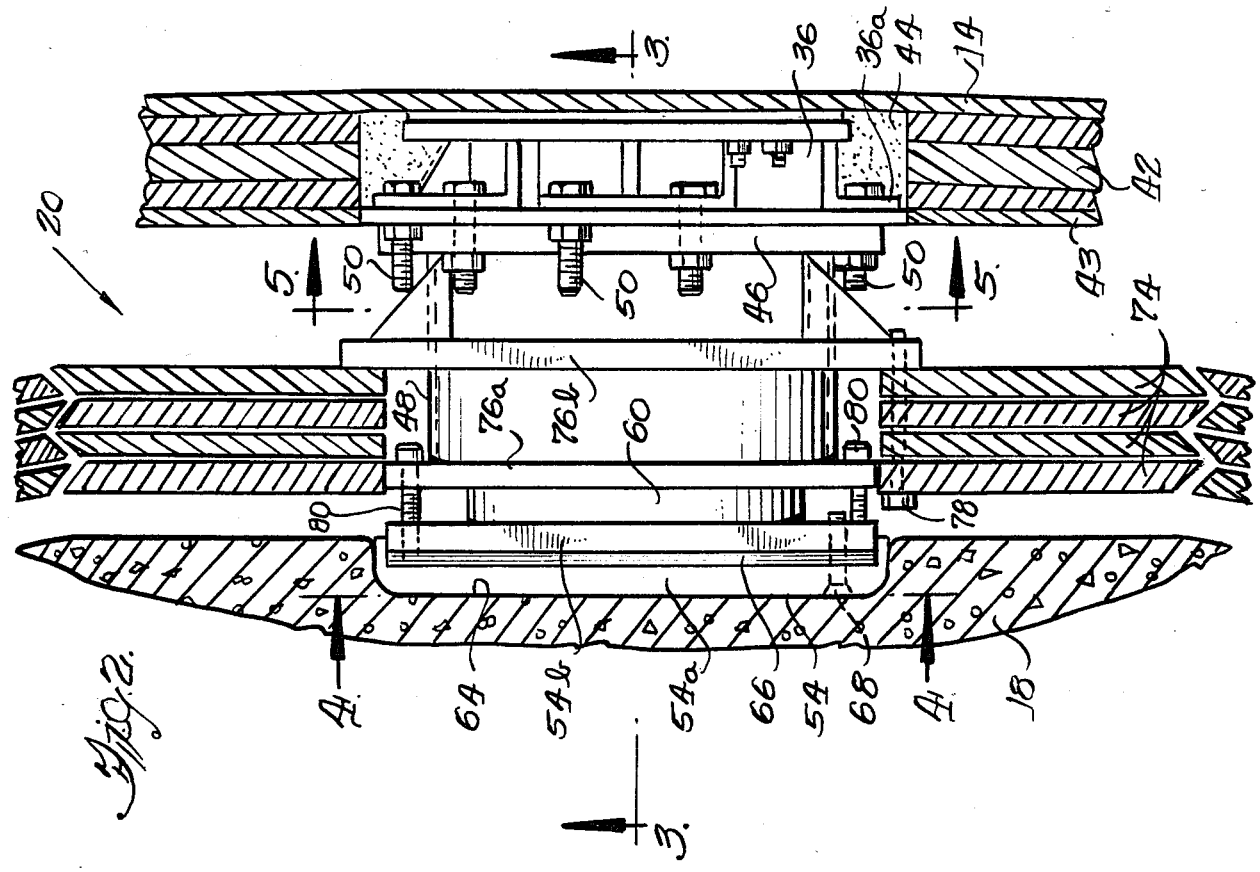

LATERAL RESTRAINT ASSEMBLY FOR REACTOR CORE

The government has rights in this invention pursuant to Contract No. DE-ATO3-76SF70046 awarded by the U.S. Department of Energy.

BACKGROUND OF THE INVENTION

The present invention relates generally to apparatus for restraining lateral movement of a reactor core relative to a reactor vessel, and more particularly to a novel lateral restraint assembly which finds particular application in restraining lateral movement of a reactor core relative to a reactor vessel when the core is subjected to high energy lateral loading such as might be encountered during seismic disturbances and the like.

Nuclear reactors, particularly of the high temperature gas-cooled type, conventionally include reactor cores which are housed within shielded core cavities formed in reactor vessels. The reactor cores are conventionally assembled from a plurality of graphite fuel and control elements which may have polygonal shaped outer configuratons and are arranged in stacked column relation so that coolant and control rod passages formed longitudinally of the fuel and control elements are in axially aligned relation. The blocks within each column may be secured together to provide relatively loose lateral support therebetween. Because of thermal expansion, irradiation shrinkage, pressure effects and creep of the reactor vessel, which is conventionally made of prestressed concrete, it has not been practical to clamp the columns of graphite blocks into a rigid cylindrical structure. However, notwithstanding the practical limitations in clamping the core assembly into a rigid structure, it is necessary to restrain lateral movement of the core relative to the reactor vessel to insure that reactivity control elements can be properly inserted into the core at all times.

It is known to mount a loosely assembled reactor core unit in spaced floating relation to a surrounding reactor vessel by means of a plurality of springs arranged between the outer periphery of the core unit and the reactor vessel. While the known spring arrangements for use in restraining lateral movement of a reactor core relative to its associated reactor vessel have proven generally satisfactory when the core undergoes generally radially outward, tangential and limited vertical movement, and are generally capable of restoring the core to a nominal position within the reactor vessel, the prior spring arrangements have not been capable of satisfactory operation in absorbing the seismic energy levels attained during seismic disturbances of the core and yet fit within the space available between the reactor core and associated reactor vessel. To overcome this problem, bilinear spring rate multi-directional spring packs have been developed such as disclosed in U.S. Pat. No. 4,073,685.

SUMMARY OF THE INVENTION

One of the primary objects of the present invention is to provide a novel relatively compact restraint assembly for use in restraining lateral movement of a reactor core at both low and high energy levels and which is operative to maintain the core elements in prearranged columns without creating load reactions detrimental to the graphite core elements.

A more particular object of the present invention is to provide a novel arrangement of lateral restraint assemblies about the periphery of a reactor core and interposed between the core and the associated shielded reactor vessel, each restraint assembly having a face plate biased against the outer periphery of the core and including a key member operatively associated with the face plate so as to enable vertical movement of the face plate relative to the key member but cooperating therewith such that the key members having their axes disposed transverse to or subtending acute angles with the direction of a high energy force restrain lateral movement of the core.

A feature of the lateral restraint assembly in accordance with the present invention lies in the provision of a key member adapted to be fixedly secured to the reactor vessel internally of the core cavity and having an inner end cooperative with a face plate so as to enable limited vertical movement of the face plate while being cooperative therewith to prevent horizontal movement of the face plate in a direction substantially transverse or tangential to the associated key member.

In accordance with the present invention, a plurality of lateral restraint assemblies are disposed within a shielded core cavity between a reactor core and the reactor vessel. The lateral restraint assemblies are disposed circumferentially of the core and each includes a face plate urged against the outer surface of the core, such as defined by permanent side reflector blocks, by a spring pack in the form of a plurality of compression springs which enable the face plate to be preloaded against the reflector blocks to establish a continuous ring structure. Each restraint assembly includes a radially disposed key member fixed at its outer end to the reactor vessel and having a radial inner end received within an opening in the face plate in a manner enabling the face plate to move radially and vertically relative to the key member as during normal operational movements of the core. The various key members and their associated face plates cooperate with the continuous ring of reflector blocks such that lateral seismic loads are transferred to and resisted by the radial key members which are disposed transverse to or subtend acute angles with the direction of the lateral seismic load, thereby restraining lateral movement of the core.

Further objects and advantages of the present invention, together with the organization and manner of operation thereof, will become apparent from the following detailed description of the invention and taken in conjunction with the accompanying drawings wherein like reference numerals designate like elements throughout the several views.

BRIEF DESCRIPTION OF THE DRAWINGS

FIG. 1 is a plan view of a reactor core within a shielded reactor core cavity and having lateral restraint assemblies in accordance with the present invention interposed between the outer periphery of the core and the reactor vessel;

FIG. 2 is an enlarged plan view of a lateral restraint assembly of the type employed in the reactor core restraint arrangement of FIG. 1;

FIG. 3 is a vertical sectional view of the lateral restraint assembly of FIG. 2, taken substantially along line 3—3 of FIG. 2;

FIG. 4 is fragmentary sectional view taken substantially along line 4—4 of FIG. 2;

FIG. 5 is a fragmentary transverse sectional view taken substantially along line 5—5 of FIG. 2; and FIG. 6 is a fragmentary horizontal sectional view taken substantially along line 6—6 of FIG. 3.

DESCRIPTION OF PREFERRED EMBODIMENT

Referring now to the drawings, and in particular to FIG. 1, the present invention is illustrated, by way of example, as being embodied in a nuclear reactor, a portion of the reactor vessel and reactor core being illustrated in FIG. 1 and indicated generally at 10. In the illustrated embodiment, the reactor vessel, which is conventionally made up of prestressed concrete, has a substantially cylindrical core cavity 12 formed therein the longtiudinal axis of which is generally vertical and the outer periphery of which is defined by a suitable metallic liner 14 affixed to the concrete reactor vessel so as to establish a shielded core cavity. A nuclear reactor core 16 is supported internally of the core cavity 12 and has an outer peripheral surface defined by a plurality of permanent side reflector blocks 18 which extend about the full periphery of the reactor core. In accordance with the present invention, a plurality of substantially identical lateral restraint assemblies 20 are arranged in circumferential spaced relation about the periphery of the reactor core 16 between the permanent reflector blocks 18 and the reactor vessel liner 14. The restraint assemblies 20 serve to restrain lateral movement of the reactor core when subjected to high intensity loading that might be brought about, for example, by seismic disturbances or other causes having high energy levels.

As will become apparent herein, the lateral restraint assemblies 20 may be employed in any of a variety of different types of reactors where it is necessary to provide lateral restraint for a relatively massive reactor core. The reactor illustrated in FIG. 1 is described briefly herein to permit an understanding of the organization and manner of operation of the lateral restraint assemblies of the present invention. Within a nuclear reactor of the type described herein, the core may be considered as a sprung mass with the reactor vessel being a relatively unsprung mass. It is further contemplated that other applications may include first and second laterally spaced members which are subject to relative lateral movement therebetween of widely varying magnitude, thereby providing a similar requirement for a lateral restraint assembly of the type provided by the present invention.

The reactor core 16 is of generally known design and includes a plurality of nuclear fuel elements 24 of generally hexagonal transverse cross sectional configuration arranged in hexagonal patterns about associated control fuel elements 26 also having hexagonal transverse cross sectional configurations. The fuel and control elements 24 and 26 conventionally comprise graphite blocks with the fuel elements having generally cylindrically shaped fuel rods inserted within longitudinal bores or holes and sealed therein. The control elements have longitudinal passages or holes for receiving control rods (not shown) in a conventional manner. The array of fuel and control elements is encircled by a plurality of replaceable mating reflector elements 28 which establish an irregular but repeat pattern about the periphery of the reactor core and against which the permanent side reflector blocks 18 are positioned.

The adjacent permanent reflector blocks have mutually abutting surfaces which define junctures 30 between each adjacent pair of permanent reflector blocks.

The fuel elements 24, control elements 26, replaceable reflector blocks 28 and permanent side reflector blocks 18 are stacked in columns with similarly configured underlying and overlying corresponding elements and blocks so as to lie in stacked layers, one such layer being illustrated in FIG. 1. The individual replaceable core elements are conventionally loosely held together by means of dowels or the like so that the entire reactor core is free to expand or contract in both vertical and horizontal or radial directions due to thermal expansion and normal operational movements. The reactor core is supported vertically at its base within the reactor core cavity or chamber 12 in a conventional manner to permit relatively free lateral or radial movement of the core. Other components of the reactor 10 which are not necessary to an understanding of the present invention are not illustrated in the drawings, it being understood that the reactor includes numerous other components as employed in conventional high temperature gas-cooled reactors.

In the illustrated embodiment, the lateral restraint assemblies 20 are disposed in circumferentially spaced relation about alternate horizontal layers of core elements and reflector blocks so that a lateral restraint assembly is interposed between the reactor vesssel and the outer peripheral surface of each permanent reflector block 18 in the selected alternate layers. The lateral restraint assemblies 20 are positioned to engage the outer surfaces of the associated permanent reflector blocks at substantially their geometrical centers and are disposed in generally vertical parallel columns.

Referring particularly to FIGS. 2-5, one of the lateral restraint assemblies 20 will be described as exemplary of all of the lateral restraint assemblies. Each restraint assembly 20 includes a mounting bracket 36 which is affixed to the metallic reactor core liner 14 through studs 38 and associated nuts 38a, the studs being mounted in normal relation on a mounting pad 40 attached directly to the inner surface of the core liner as by welding. The mounting bracket 36 has a mounting flange 36a which is spaced radially inwardly from the core cavity liner 14 thereby enabling the mounting bracket 36 to be received within a suitable recess formed in a thermal barrier layer 42 which, with a steel retainer plate 43, lines the inner surface of the annular liner 14 in a conventional manner. A ceramic fiber insulation material, such as indicated at 44, is inserted in the voids surrounding the mounting bracket 36.

A spring container having a planar mounting plate 46 and an annular right cylindrical shaped wall 48 is mounted on the flange 36a of mounting bracket 36 through screws 50 such that the spring container defines a longitudinal center axis radial to the longitudinal axis of the core 16 and intersects the outer surface of the corresponding permanent reflector block 18 at approximately its geometrical center.

Each mounting plate 46 supports a face plate 54 through a spring pack in the form of a plurality of coil compression springs 56 disposed within the annular wall 48 of the spring container. In the illustrated embodiment, eight coil compression springs 56 are supported by each mounting plate 46 through stub type support members 58 such that the compression springs are disposed in parallel equidistantly circumferentially spaced relation about the center axis of the annular wall 48. The ends of the compression springs 56 opposite the mounting plate 46 are seated within an annular recess 60a formed in an annular spring retainer 60 which is fixed to the face plate 54, as by welding, so as to be substantially concentric to the geometrical center of the face plate.

In the illustrated embodiment, the face plate 54 has a generally rectangular elevational configuration and is urged by the compression springs 56 into a slot or recess 64 formed longitudinally in the outer surface of the corresponding permanent reflector block 18. The slot or recess 64 preferably extends the full height or length of the permanent reflector block and is sized to enable vertical movement of the associated face plate therealong while preventing relative movement between the face plate and reflector block in a plane transverse to the recess 64. Each face plate 54 may comprise a composite plate having an outer plate portion 54a, a backing plate portion 54b and shims 66 selectively inserted therebetween, all of which are secured together by screws 68.

In accordance with an important feature of the present invention, each lateral restraint assembly 20 includes a radial key member, indicated generally at 70 in FIG. 3, which is fixed on the mounting plate 46 in normal relation thereto so that the longitudinal axis of the radial key coincides with the geometrical center of the mounting plate 46 and thus the center axis of the annular wall 48. Each radial key 70 has a cylindrical tubular portion 70a one end of which is affixed to the mounting plate 46 and the opposite end of which is affixed to a circular flange 70b formed on a cylindrical pin or shaft portion 70c of predetermined diameter. As best illustrated in FIGS. 3 and 4, the cylindrical shaft portion 70c of the radial key member 70 is received within a rectangular opening 72 formed in and extending centrally through the associated face plate 54. The rectangular opening 72 has a horizontal width just slightly greater than the diameter of the associated cylindrical shaft portion 70c and has a vertical height equal to approximately twice its width. In this manner, each face plate 54 may undergo limited vertical movement relative to its associated radial key member 70 but cannot move any appreciable distance in a horizontal direction generally transverse to the associated radial key member. The radial key member 70 has a length such that when the restraint assembly 20 is mounted between a reflector block 18 and the core cavity liner 14, the shaft portion 70c extends into the opening 72 a distance equal to approximately one half the thickness of the face plate.

Preferably, each lateral restraint assembly 20 carries a thermal neutron side shield in the form of multiple carbon steel plates 74 which are supported in substantially fixed relation on the associated spring container through a pair of flanges 76a and 76b fixed on the annular wall 48, and associated mounting screws 78. The thermal neutron side shields preferably are sized to extend substantially the full circumference of the core.

To facilitate assembly of the spring restraint assemblies 20 between the associated permanent reflector blocks 18 and the outer reactor core cavity liner 14, and to enable preloading of the face plates against the associated permanent reflector blocks so as to form a continuous tight outer ring of permanent side reflector blocks 18, the face plates 54 are initially positioned to effect predetermined compression of the corresponding compression springs 56 and are retained in an initial assembly position by a plurality of cap screws 80 (FIG. 2). The cap screws 80 releasably extend through suitable openings in the flange 76a and have threaded connection with the associated face plate. Upon predetermined initial preloading of the compression springs 56 and assembly of the lateral restraint assemblies 20 between the core cavity liner 14 and their associated reflector blocks 18, the set screws 80 are removed so that the compression springs 56 apply predetermined preloads to the face plates 54 against their associated permanent reflector blocks 18 sufficient to maintain the reflector blocks in a continuous tight ring. In this manner, lateral or radial relatively low energy loads resulting from normal operating movements of the core elements are transferred to and dissipated by the compression springs 56 without damage to the graphite fuel elements.

Should the reactor 10 be subjected to high energy loads from seismic disturbances or other high energy causes tending to move the core laterally relative to the reactor vessel, the face plates 54 associated with the radial keys 70 which are disposed transverse to or subtend acute angles with the direction of the seismic loading force engage the associated radial keys which, being fixed to reactor vessel, restrain horizontal or lateral movement of the face plates and thereby the reactor core.

By providing elongated openings 72 in the face plates 54, vertical thermal growth of the reactor core, and thereby vertical movement of the face plates, is accommodated without the face plates engaging the associated radial keys 70. It will be appreciated that sufficient radial spacing is provided between the various elements within the spring containers to accommodate maximum vertical movement which the face plates might undergo relative to the retainer walls 48 and key members 70.

While a preferred embodiment of the present invention has been illustrated and described it will be understood to those skilled in the art that changes and modifications may be made therein without departing from the invention in its broader aspects. Various features of the invention are defined in the following claims.

We claim:

1. In a nuclear reactor including a reactor vessel defining a shielded core cavity having a reactor core extending vertically along a longitudinal axis and being located internally of said cavity, said reactor core having a plurality of layers of reflector blocks defining an outer peripheral surface for the core spaced from the vessel and being supported in a manner permitting at least limited lateral movement relative to the vessel; the combination therewith comprising lateral restraint means including a plurality of lateral restraint assemblies disposed in circumferential spaced relation about the periphery of the reactor core between the core and reactor vessel, said lateral restraint elements being located circumferentially about the outer peripheral surface of the core and being located in a number of layers to engage intermediate layers of reflector blocks between the top and the bottom of the core to restrain the peripheral core surface each of said restraint assemblies including a face plate having a contact surface to contact one of the reflector blocks of the core, spring means biasing said face plate against the reflector block on the outer periphery of the core, said spring means being disposed to allow radial expansion and contraction of the core and vertical movement of the core relative to the vessel, said spring means exerting forces substantially horizontally directed between the top and the bottom of the core and only in the radial direction and at locations spaced circumferentially and vertically about the entire peripheral surface of the core, and a key means to restrain core movement in a direction parallel to the contact surface of the face plate and perpendicular to the longitudinal axis relative to the vessel due to seismic loads while allowing substantial vertical movement in a direction parallel to the core axis and radial movement toward and from the core axis, said key means including elongated key members and elongated vertically extending openings associated together, said key members and said openings allowing vertical movement and radial movement with core expansion and in which vertically elongated walls defining the openings engage said key members to restrict core movement in a direction parallel to the contact surface of the face plate and perpendicular to the longitudinal axis of the core.

2. A nuclear reactor as defined in claim 1 wherein the outer periphery of the reactor core is generally cylindrical and a lateral restraint assembly is associated with selected ones of said reflector blocks such that the face plate of each of said restraint assemblies engages the outer surface of an associated reflector block.

3. A nuclear reactor as defined in claim 1 wherein each of said key members has its radially outer end fixed to said reactor vessel.

4. A nuclear reactor as defined in claim 1 wherein said biasing means associated with each of said face plates includes at least one compression spring interposed between the associated face plate and said reactor vessel so as to resiliently urge the associated face plate against the outer periphery of the reactor core.

5. A nuclear reactor as defined in claim 1 wherein said biasing means associated with each of said face plates includes a plurality of compression springs disposed in generally parallel circumferentially spaced relation about the axis of the associated key member, said compression springs having opposite ends acting against the associated face plate and said reactor vessel.

6. A nuclear reactor as defined in claim 5 including an annular spring retainer fixed to each of said face plates and adapted for cooperation with the radial inner ends of said compression springs, each of said spring retainers being concentric with the center axis of its associated key member.

7. A nuclear reactor as defined in claim 1 wherein each of said face plates has an opening therethrough generally centrally thereof, each of said key members having an end portion adapted to be received within the central opening in the associated face plate and being sized so as to substantially prevent horizontal movement of the associated face plate in a direction generally transverse to the axis of the key member.

8. A nuclear reactor as defined in claim 7 wherein each of said face plates is received within a recess formed in the outer periphery of the reactor core and extending substantially longitudinally therealong so that lateral movement of the core tends to effect a corresponding movement of the face plates.

9. A nuclear reactor as defined in claim 1 wherein said key members have generally stepped cylindrical configurations.

10. A nuclear reactor as defined in claim 2 wherein said reflector blocks are positioned in layers about the full circumferences of said core, and including a lateral restraint assembly operatively associated with each reflector block in selected ones of said layers.

11. A nuclear reactor as defined in claim 10 wherein adjacent ones of said reflector blocks define mutually interfacing surfaces therebetween, said biasing means and associated face plates beng operative to maintain said reflector blocks in a substantially continuous ring about the reactor core such that lateral movement of said core is transferred to said face plates.

12. A nuclear reactor as defined in claim 11 wherein each of said reflector blocks has a recess formed longitudinally therealong adapted to receive the corresponding face plate therein, said biasing means including a plurality of compression springs adapted to enable radial preloading of said face plates against their correspondig reflector blocks.

13. A nuclear reactor as defined in claim 12 wherein said key members are fixed to said reactor vessel and extend radially inwardly toward the longitudinal axis of the reactor core, each of said face plates having an opening therethrough adapted to receive the associated key member therein, each of said openings being sized so as to enable movement of the corresponding face plate in the longitudinal direction of the core relative to its associated key members but substantially prevent transverse movement of the face plate relative to its associated key member in a plane transverse to the longitudinal axis of the core.

14. In a nuclear reactor including a reactor vessel defining a shielded core cavity having a reactor core extending vertically along a longitudinal axis and being located internally of said cavity, said reactor core being cylindrical and having layers of reflector blocks and having an outer peripheral cylindrical surface spaced from the vessel and being supported in a manner permitting at least limited lateral movement relative to the vessel; the combination therewith comprising lateral restraint means including a plurality of lateral restraint assemblies disposed in circumferential spaced relation about the cylindrical periphery of the reactor core between the core and reactor vessel, said lateral restraint assemblies being located in spaced layers from the top to the bottom of the core to engage intermediate layers of the reflector blocks, each of said restraint assemblies including a face plate having a contact surface to contact one of te reflector blocks of said core, spring means biasing said face plate against the reflector block on the outer periphery to the core, said spring means exerting substantially only radially directed forces to the reflector blocks in said layers between the top and bottom of the core and at locations spaced both vertically and circumferentially about substantially the entire peripheral surface of the core, key members and openings in the lateral restraint assemblies operatively associated with said face plate and said vessel to restrain core movement in a direction parallel to the contact surface of the face plate and the perpendicular to longitudinal axis relative to the vessel due to seismic loads and to allow vertical and radial expansion of the core, and selectively releasable preloading means to compress said spring means radially each to a predetermined load during installation thereof and then releasable to apply a radially directed compression spring loading to elements of the core and to assist in keeping the outer ring of the core tight.

* * * * *

UNITED STATES PATENT AND TRADEMARK OFFICE
CERTIFICATE OF CORRECTION

PATENT NO. : 4,596,689

DATED : June 24, 1986

INVENTOR(S) : Wilhelm Gorholt and Raymond K. Luci

It is certified that error appears in the above-identified patent and that said Letters Patent is hereby corrected as shown below:

On the title page Assignee Data should read

-- United States of America Represented by the Secretary of the DOE --.

Col. 1, Line 24, Change "configuratons" to --configurations--;
Col. 2, Line 67, After "is" insert --a--;
Col. 6, Line 8, Change "maintaint" to --maintain--;
Col. 8, Line 4, Change "beng" to --being--;
Col. 8, Line 14, Change "correspondig" to --corresponding--'
Col. 8, Line 44, Change "te" to --the--;
Col. 8, Line 46, Change "to" to --of--.

Signed and Sealed this

Eighth Day of December, 1987

Attest:

DONALD J. QUIGG

*Attesting Officer*

Commissioner of Patents and Trademarks